(12) United States Patent
Leser et al.

(10) Patent No.: US 12,501,914 B2
(45) Date of Patent: Dec. 23, 2025

(54) FOAMED FROZEN FOOD PRODUCTS

(71) Applicant: SOCIETE DES PRODUITS NESTLE S.A., Vevey (CH)

(72) Inventors: Martin Leser, Bretigny-sur-Morrens (CH); Vincent Daniel Maurice Meunier, Epalinges (CH); Zuzana Sediva, Zurich (CH); Erich Josef Windhab, Hemishofen (CH)

(73) Assignee: Societe des Produits Nestle S.A., Vevey (CH)

( * ) Notice: Subject to any disclaimer, the term of this patent is extended or adjusted under 35 U.S.C. 154(b) by 758 days.

(21) Appl. No.: 17/595,951

(22) PCT Filed: Jun. 4, 2020

(86) PCT No.: PCT/EP2020/065557
§ 371 (c)(1),
(2) Date: Nov. 30, 2021

(87) PCT Pub. No.: WO2020/245317
PCT Pub. Date: Dec. 10, 2020

(65) Prior Publication Data
US 2022/0225634 A1    Jul. 21, 2022

(30) Foreign Application Priority Data
Jun. 5, 2019 (EP) .................................. 19178523

(51) Int. Cl.
| | |
|---|---|
| A23G 9/20 | (2006.01) |
| A23G 9/34 | (2006.01) |
| A23G 9/46 | (2006.01) |
| A23P 30/40 | (2016.01) |

(52) U.S. Cl.
CPC .................. *A23G 9/20* (2013.01); *A23G 9/34* (2013.01); *A23G 9/46* (2013.01); *A23P 30/40* (2016.08)

(58) Field of Classification Search
CPC ... A23G 9/20; A23G 9/34; A23G 9/46; A23G 9/045; A23G 2220/02; A23G 3/52; A23P 30/40
See application file for complete search history.

(56) References Cited

U.S. PATENT DOCUMENTS

| | | | | |
|---|---|---|---|---|
| 3,217,503 | A | * 11/1965 | Mitchell | ................. C01B 32/40 62/1 |
| 3,220,204 | A | * 11/1965 | Adler | ..................... C01B 32/55 62/70 |
| 3,761,285 | A |   9/1973 | Nagasawa et al. | |

(Continued)

FOREIGN PATENT DOCUMENTS

| | | | | |
|---|---|---|---|---|
| CA | 2015444 A | * 10/1990 | ............. | A23G 9/045 |
| CN | 104413513 A |   3/2015 | | |

(Continued)

OTHER PUBLICATIONS

European Office Action for Appl No. 20 729 771.4 dated May 2, 2023.

*Primary Examiner* — Drew E Becker
(74) *Attorney, Agent, or Firm* — K&L Gates LLP (57) ABSTRACT

Use of a gas hydrate for producing a frozen food foam product, wherein the gas comprises air and/or one or more of carbon dioxide, nitrogen, nitrous oxide, argon and oxygen, preferably the gas comprises carbon dioxide and/or nitrogen.

9 Claims, 6 Drawing Sheets

(56) References Cited

U.S. PATENT DOCUMENTS

| | | | |
|---|---|---|---|
| 4,289,794 A | 9/1981 | Kleiner et al. | |
| 4,333,315 A * | 6/1982 | Zemelman | A23G 9/20 62/69 |
| 4,347,707 A * | 9/1982 | Zemelman | A23L 3/37 62/69 |
| 4,393,660 A * | 7/1983 | Kleiner | A23G 9/325 261/DIG. 7 |
| 4,398,394 A * | 8/1983 | Kleiner | A23G 9/20 62/69 |
| 4,398,395 A * | 8/1983 | Hinman | A23G 9/20 62/69 |
| 4,404,807 A * | 9/1983 | Zemelman | F25C 1/00 62/69 |
| 4,487,023 A * | 12/1984 | Hegadorn | C01B 21/22 62/69 |
| 4,826,699 A * | 5/1989 | Soe | A23G 9/20 426/654 |
| 4,930,319 A * | 6/1990 | Bee | C01B 32/50 62/46.1 |
| 5,055,315 A * | 10/1991 | Bee | A23G 9/20 426/477 |
| 5,404,727 A * | 4/1995 | Baker | A23G 9/045 62/69 |
| 5,538,745 A | 7/1996 | Tapfer et al. | |
| 6,576,276 B1 * | 6/2003 | Gupta | A23G 9/06 426/524 |
| 2006/0045948 A1 * | 3/2006 | Shilling | A23G 9/34 426/393 |
| 2008/0069924 A1 * | 3/2008 | Zeller | A21D 2/18 426/512 |
| 2011/0244079 A1 * | 10/2011 | Telford | A23G 9/285 426/67 |
| 2013/0183407 A1 * | 7/2013 | Cebula | A23G 9/20 426/477 |
| 2015/0017298 A1 * | 1/2015 | Colmerauer | A23F 5/42 426/465 |
| 2018/0352831 A1 * | 12/2018 | Aldred | C01B 32/50 |
| 2022/0304341 A1 * | 9/2022 | Windhab | A23L 2/40 |

FOREIGN PATENT DOCUMENTS

| | | |
|---|---|---|
| EP | 0352829 A1 | 1/1990 |
| EP | 0395145 | 10/1990 |
| JP | S63294469 A | 12/1988 |
| JP | H06343398 A | 12/1994 |
| JP | 2007306863 | 11/2007 |
| JP | 2008237034 | 10/2008 |
| WO | 0234065 | 5/2002 |
| WO | 2010069769 | 6/2010 |
| WO | 2017093084 | 6/2017 |
| WO | 2018096996 A1 | 5/2018 |
| WO | 2018101117 | 6/2018 |

\* cited by examiner

A) Phase diagram for sucrose solutions-$CO_2$ systems with different sucrose concentrations B) $CO2/N2$-water phase diagram for different molar concentrations of CO2

FOAMED FROZEN FOOD PRODUCTS

CROSS REFERENCE TO RELATED APPLICATIONS

The present application is a National Stage of International Application No. PCT/EP2020/065557, filed on Jun. 4, 2020, which claims priority to European Patent Application No. 19178523.7, filed on Jun. 5, 2019, the entire contents of which are being incorporated herein by reference.

FIELD OF THE INVENTION

The present invention relates to food product dispersions generated by foaming with gas hydrates or gas hydrate slurries dosed into food matrices in their liquid to paste-like state. The present invention further relates to foamed frozen food products, for example ice cream, generated by foaming with gas hydrates or gas hydrate slurries.

BACKGROUND TO THE INVENTION

Foaming of highly viscous food matrices (>ca. 5 Pas) is challenging due to energy dissipation, dissolution, solid propellants/blowing agents not being food grade, and lower gas release capacities.

The state of the art with respect to foaming focuses predominantly on foaming food products with pure gas using whipping, foaming frozen products by oxidized ferulyated polymers, discharging a gas/product mix from a nozzle, using high pressure homogenizers for stabilization, and chemical whipping agents and/or stabilizers, thickeners, proteins (U.S. Pat. No. 7,297,359B2, EP1000723A3, U.S. Pat. No. 6,497,913B1).

Viscous food matrices having a viscosity greater than 5 Pas with 40-70 wt % dry solids) such as frozen food products (for example ice cream), high-solid content extrudates, low DE glucose syrups pastes and others are multi-phase systems. These require challenging technologies for pumping, conveying, dispensing and general processing. Dispersing gas or air into such media with low viscosity ratios of the bubble relative to the surrounding fluid is difficult due to high critical capillary numbers related to bubble break-up.

There is a clear need to find a better way to generate microfoams from viscous liquid to paste-like foamable multiphase food materials.

SUMMARY OF THE INVENTION

The inventors have surprisingly found that gas hydrates or mixtures, suspensions, or slurries of such may be used for foaming various types of liquid to paste-like food matrix fluids, and dispersions with aqueous or non-aqueous continuous liquid phases. Gas hydrate slurries have been successfully formed from solutions comprising water in a high-pressure clathrate hydrate slurry generator (CLAG), and so can be flexibly formed from various food-grade gases and/or gas mixtures (noble gases, $CO_2$, $N_2$, $O_2$, $N_2O$, air) and pure water or solutions containing a water fraction (dispersions, emulsions, suspensions).

The present invention applies a small fraction of concentrated water comprising a dispersion of gas hydrate into viscous food matrices under temperature and pressure conditions within a sufficiently thermodynamically stable state that allow gas hydrates to co-exist. Thereafter the gas hydrate dispersion is mixed with a viscous liquid to paste-like food dispersion. Homogenous mixing is largely facilitated due to the gas hydrate slurry physical properties. Typically, its viscosity and density resemble those of the viscous food dispersion. The mixed gas hydrate slurry/viscous food dispersion composite is then dissociated by decreasing the pressure and/or increasing the temperature, thereby releasing the entrapped gas from the gas hydrate structure. Up to 150-fold of the gas hydrate crystal volume can evolve, thus foaming the viscous liquid to paste-like food matrix evenly.

Accordingly, one aspect of the present invention provides use of a gas hydrate or gas hydrate slurry for producing a food foam or a food foam product, preferably a frozen food foam product. The food foam product may be a mousse. The frozen food foam product is preferably a frozen dessert, for example ice cream or sorbet. The gas may comprise air and/or may comprise one or more of carbon dioxide, nitrogen, nitrous oxide, argon and oxygen, preferably the gas comprises carbon dioxide and/or nitrogen.

According to another aspect, the present invention provides use of a gas hydrate for gasifying a food matrix fluid, preferably a liquid to semi-liquid food matrix fluid. Preferably, the food matrix fluid has a viscosity ranging from 0.001 Pas to 1000 Pas. A viscosity of 0.001 Pas can be described as liquid and a viscosity of 1000 Pas can be described as paste-like. The viscosity range may also be between the lower range 0.001 Pas and any one of the upper ranges 200 Pas, 400 Pas, 600 Pas, or 800 Pas. The viscosity range may also be between any one of the lower ranges 0.001 Pas, 0.01 Pas, 0.1 Pas, 1 Pas, 10 Pas, 100 Pas and the upper range 1000 Pas. The gas may comprise air and/or may comprise one or more of carbon dioxide, nitrogen, nitrous oxide, argon, and oxygen, preferably the gas comprises carbon dioxide and/or nitrogen.

According to another aspect, the gas hydrate slurry can be formed and stored below the critical gas hydrate dissociation conditions, typically at sufficiently low temperature and sufficiently high static pressure. The gas hydrate slurry, typically a concentrated gas hydrate crystal watery suspension, can thereafter be added to a food matrix fluid, preferably a viscous food matrix fluid (FMF) under substantially the same temperature and pressure conditions. After mixing the gas hydrate slurry with a food matrix to provide a food matrix/slurry mix, the critical stability pressure and temperature conditions are crossed, leading to controlled volume expansion (or foaming) through the dissociation of gas hydrates.

In some embodiments, an aqueous solution, preferably a sugar solution-based aqueous solution is chosen, preferably a viscous sugar solution-based aqueous solution. Typically, the viscosity is adjusted by increasing sugar concentration or molecular weight of the sugar mixture, for example by varying the dextrose equivalent of the sugar solution to between DE 6 to DE 40) and preferably generating a freezing point depression, preferably generating a pronounced or significantly different freezing point depression.

In some embodiments, the sugar solution comprises sucrose (Disaccharide). In some embodiments, the sugar solution has a dextrose equivalent (DE) of between DE 6 to DE 40. DE denotes the weight-percentage of reducing sugars in the dry matter calculated as glucose. A small DE value thus stands for longer Oligosaccharide chain length. This means less enzymatically degraded starch is transferred into glucose units.

Such sugar solutions typically comprise water with or without additionally contained dispersed components. Typically, these dispersed components act as thermodynamic inhibitors of gas hydrate formation and growth, thereby allowing a controlled homogeneous flow pattern in existing gas hydrate slurries. Further substances can be added to the representative sugar solution-based aqueous solutions. Typically, these are one or more of surfactants, proteins, anti-freeze proteins, biopolymers, amino-acids and/or oils. Preferably, these further substances allow emulsion formation.

According to another aspect, the present invention provides a method of producing a continuous phase slurry comprising gas hydrates, preferably a sugar solution-based gas hydrate slurry comprising:
(a) providing a solution, preferably a sugar solution, comprising water optionally with other soluble components that generate a freezing point depression;
(b) cooling the solution comprising water; and
(c) pressurizing the solution comprising water with gas, to provide a slurry comprising gas hydrates, wherein the gas is air and/or comprises one or more of carbon dioxide, nitrogen, nitrous oxide, argon and oxygen, preferably the gas comprises carbon dioxide or carbon dioxide and nitrogen.

In some embodiments, the present invention provides a method of producing a sugar solution-based gas hydrate slurry:
(a) providing a sugar solution comprising water optionally with other soluble components that generate a freezing point depression;
(b) cooling the sugar solution comprising water to between −10° C. and 10° C., or to between −5° C. and 5° C.; or to no lower than about −7° C., and/or
(c) pressurizing the solution comprising water with gas to a pressure of from 10 to 300 bar, or from 15 to 100 bar, or from 15 to 50 bar, or from 15 to 35 bar.

In some embodiments the method comprises cooling the sugar solution in step (b) to between 0 and 8° C., or to about 5° C.; and pressurizing in step (c) preferably with carbon dioxide, preferably at 15 to 35 bar.

In some embodiments, the method comprises cooling the sugar solution in step (b) to between 0 and 5° C. or to about to about 2° C. and pressurizing the solution with $CO_2$ to about 15 to 25 bar or to about 20 bar, prior to pressurizing the solution with $N_2$ to about 30 to 285 bar or to about 35-50 bar or to about 35 bar.

In some embodiments the method further comprises a step of distributing the gas hydrate in the sugar solution-based gas hydrate slurry. Typically, this is achieved using a device with a rotating geometry. Suitable devices include a pin mixer, surface scraped heat exchanger or other or a static mixer or a conveying device such as a centrifugal, gear or positive displacement pump or any thin fluid layer(s) generating device.

According to another aspect, the present invention provides a sugar solution-based gas hydrate slurry, hereinafter referred to as a 3S slurry, wherein the gas is air and/or comprises one or more of carbon dioxide, nitrogen, nitrous oxide, argon and oxygen, preferably carbon dioxide and/or nitrogen. The 3S slurry may be obtained by the above-mentioned method.

In some embodiments, the 3S slurry has a viscosity of between $10^{-2}$ and 10 Pas, or between 20 mPas and 1 Pas, or between 30 mPas and 500 Pas, or about 30 mPas or more, and/or about 100 mPas or less, preferably wherein the viscosity of the 3S slurry is greater than the viscosity of the sugar solution, preferably by up to 8 times.

In some embodiments the 3S slurry comprises 0.01-7.5 mol/L, 0.1-7.5 mol/L, 1-5 mol/L, 1-3 mol/L, or about 1-2 mol/L of gas. In some preferred embodiments the 3S slurry comprises carbon dioxide, preferably 0.5-5 mol/L, 1-5 mol/L, 1-2 mol/L, or about 1.4 mol/L of carbon dioxide. In some embodiments the 3S slurry has a ratio of gas in the hydrate fraction to gas in the liquid fraction (H:L) of from 5:1 with volumetric hydrate fractions of 10 to 35 vol %, to H:L of about 1.2:1 at about 10 vol % hydrate, or preferably about 2:1 at about 17 vol % gas hydrate fraction.

In some embodiments, the 3S slurry comprises 10 wt % to 65 wt %, 20 wt % to 55 wt %, 35 wt % to 55 wt %, 45 wt % to 55 wt % or 50 wt % solids. In some embodiments, the 3S slurry comprises 10 wt % to 65 wt %, 10 wt % to 50 wt %, 20 wt % to 40 wt %, 15 wt % to 35 wt % or about 25 wt % solids.

In some embodiments, the slurry has a viscosity of between $10^{-2}$ and 10 Pas or between 20 mPas to 1 Pas or between 30 mPas and 500 mPas or between 30 mPas to 40 mPas. Typically, this viscosity is interdependent on the solution comprising water composition and the temperature.

According to another aspect, the present invention provides a method of producing a frozen foamed food product, preferably ice cream, comprising:
(a) mixing a sugar solution-based gas hydrate slurry and a food matrix fluid to provide a sugar solution-based gas hydrate slurry/food matrix fluid mixture;
(b) releasing the pressure and/or increasing the temperature of the sugar solution-based gas hydrate slurry/food matrix fluid mixture to provide a foamed sugar solution-based gas hydrate slurry/food matrix mixed fluid mixture;
(c) fixing the foamed sugar solution-based gas hydrate slurry/food matrix fluid mixture by freezing, preferably at −25 to −5° C. to provide a frozen foamed food product, preferably ice cream.

The sugar solution-based gas hydrate slurry/food matrix fluid mixture is hereinafter referred to as a 3SFMF fluid system. The foamed sugar solution based gas hydrate slurry/food matrix fluid mixture is hereinafter referred to as a foamed 3SFMF system.

In some embodiments the FMF is a solution or a dispersion. In some embodiments, the FMF comprises 10 wt % to 75 wt %, 30 wt % to 75 wt %, 50 wt % to 75 wt %, 50 wt % to 70 wt %, or 60 wt % to 65 wt % solids in the soluble or non-soluble state. In some embodiments, the FMF comprises about 40 wt % solids in the soluble or non-soluble state. Preferably, the FMF solution or dispersion does not comprise gas hydrates.

In some embodiments the gas hydrates in the 3SFMF fluid system are substantially dispersed upon mixing, for example by using a device with a rotating geometry such as a pin mixer, surface scraped heat exchanger or a static mixer, extruder or a conveying device such as a centrifugal, gear or positive displacement pump.

In some embodiments the 3S slurry is mixed with the FMF fluid under approximately isobaric and isothermal conditions, preferably wherein the approximately isobaric-isothermal conditions are a temperature of between −10° C. and 10° C., or between −5° C. and 5° C., or no lower than about −7° C. and/or a gas pressure from 10 to 300 bar, or from 15 to 100 bar, or from 15 to 50 bar, or from 15 to 30 bar. The temperature and pressure used typically depend on the freezing point depression and composition of the aqueous solution used for the production of the 3S slurry. In some embodiments the 3S slurry is added to the FMF fluid until the 3SFMF fluid system reaches an overrun of from 50 to 500%, or from 100 to 500%, or from 100 to 150%, or from 50% to 100%, preferably about 100%. Overrun is defined here as the increase in volume compared to the non-foamed fluid volume.

In some embodiments, during the step of releasing the pressure and/or increasing the temperature of the 3SFMF fluid system, the pressure is released preferably stepwise to between 1 bar and 100 bar, or to between 5 bar to 50 bar before preferably releasing it to ambient surrounding pressure, and/or the temperature of the 3SFMF fluid system is increased to between −5° C. and 15° C., or to above 0° C., or to about 10° C.

According to another aspect, the present invention provides a foamed food product, preferably a frozen foamed food product, preferably made by a method of the invention. Typically the bubble size is 5 to 60 μm. Typically, the ice crystal size is 5 to 60 μm.

The foamed food product is typically a mousse. The frozen foamed food product is typically a frozen dessert, for example ice cream or sorbet, preferably ice cream.

DESCRIPTION OF DRAWINGS

Sketch representing the individual stages of input materials (solution comprising water, gas and FMF food matrix fluid) and their processed forms, the sugar solution-based gas hydrate slurry (3S slurry) comprising gas hydrates and the 3SFMF sugar solution-based gas hydrate slurry/food matrix fluid mixture, the foamed 3SFMF and stabilized frozen foamed 3SFMF.

FIG. 3—Validation of the thermodynamic model used in FIG. 2 (A) for the 25 wt % sugar solution and pure water The validation was done by a isochoric T-cycle (temperature-cycle) heating and cooling method in a high-pressure stirred reactor. The dissociation temperature was taken as the equilibrium point on the Hydrate-Liquid-Vapor stability line. Further validation was experimentally assessed in high-pressure differential scanning calorimetry (HP-DSC) for 10, 20, 30 and 50 bar. SS Stands for sugar solution.

E stands for EGLI (main stream line) and L stands for the CLAG loop reactor (side stream), the temperature and pressure on the loop are depicted and compared with the inlet temperature and the pressure on the main stream EGLI line. The transfer occurred close to isothermal and isobaric conditions.

DETAILED DESCRIPTION

Gas Hydrate

"Gas hydrates" are also known as clathrate hydrates or water clathrates. Gas hydrates are crystalline water-based solids physically resembling ice, in which gases are trapped inside "cages" of hydrogen bonded water molecules.

Most low molecular weight gases, including $O_2$, $H_2$, $N_2$, $N_2O$, $CO_2$, $CH_4$, $H_2S$, Ar, Kr, Ne, He, Xe, hydrocarbons (methane, ethane, propane, isobutene, pentane), hydrogen sulfide will form hydrates at suitable temperatures and pressures. Gas hydrates may be formed by providing a suitable gas and reducing the temperature and/or increasing the gas pressure of a suitable solution (e.g. a 25 wt % sugar solution).

Any gas suitable for producing a food matrix fluid material or suitable for use in industrial food processes may be used. For example, the gas may be air and/or may comprise one or more of carbon dioxide, nitrogen, nitrous oxide, oxygen and argon. In preferred embodiments the gas comprises carbon dioxide and/or nitrogen. In some embodiments the gas hydrates comprise substantially the same gas. In some embodiments the gas is a pure gas (for example comprising 99% or more, or 99.9% or more, or 100% of a single gas). In preferred embodiments the gas hydrates are $CO_2$ and/or $N_2$ hydrates.

Suitable temperatures and gas pressures will vary depending on the gas and the composition and freezing point depression of the aqueous solution used for formation of gas hydrate slurries. For example, a $CO_2$ hydrate may be formed in a 25 wt % sugar solution at about 5-7° C. and about 26-35 bar, or in a 50 wt % sugar solution at about 2.5° C. and about 30 to 35 bar. A lower temperature solution will require a lower gas pressure, and vice versa a higher temperature solution will require a higher gas pressure. For example, a $CO_2$ hydrate may be formed in a 25 wt % sugar solution at about 6° C. and about 30 bar, or at about −3.5° C. and about 10 bar. They optionally include conditions in which water ice forms and/or in which the gas condenses to form a liquid gas phase. For example, −2.04° C. is about the freezing point depression for a 25 wt % sugar solution, so lower temperatures can/or should not be used for forming gas hydrates in such a 25 wt % sugar solution depending on the application. For example, the second quadruple point (the point where liquid, hydrate, vapor and condensed gas phases meet) is about 8.5° C. and 43.4 bar for the 25 wt % sugar solution-$CO_2$ system. Therefore, $CO_2$ will be a liquid at lower temperatures and/or higher pressures.

The temperature and gas pressure can be varied depending on the desired viscosity and/or desired gas concentration of the 3S sugar solution-based slurry. The temperature and pressure required to form gas hydrates are interdependent and will vary depending on the gas and the solution (e.g. the wt % of solids in the sugar solution). Exemplary condition ranges for forming $CO_2$ hydrates in a 25 wt % sugar solution are 1-7° C. and 20-40 bar, or about 20 bar or more. Exemplary condition ranges for forming $N_2$ hydrates in a 30 wt % sugar solution are −2.5° C. to 5.5° C. and 140 to 285 bar. Exemplary condition ranges for forming $N_2O$ hydrates in a 25 wt % sugar solution are about 0 to 9° C. at 12 to 38 bar. To form hydrates at lower pressures, lower temperatures must be used.

In some embodiments the gas hydrates are formed by a first gas prior to introducing one or more further gases. Thus, the final gas hydrates may contain two or more gases i.e. are mixed gas hydrates. For example, in mixed $CO_2/N_2$ hydrates $CO_2$ allows $N_2$ to get embedded at lower pressures by leaving small hydrate cages unoccupied. First the $CO_2$ hydrate may be prepared at lower pressures, then $N_2$ may be added at higher pressures. Similar methods may be used for any combination of suitable gases. In preferred embodiments the gas hydrates are mixed $CO_2/N_2$ hydrates. The molar fraction of $CO_2$ trapped in the $CO_2/N_2$ hydrates may be from 0.1 to 0.99, or from 0.5 to 0.99, or from 0.8 to 0.99, or from 0.9 to 0.99, or from 0.95 to 0.99, or about 0.97. In other embodiments the gas hydrates are $N_2O/N_2$ hydrates (Yang, Y., et al., 2017. Environmental science & technology, 51 (6), pp. 3550-3557) or $N_2O/CO_2$ hydrates or $N_2O/CO_2/N_2$ hydrates.

In preferred embodiments $CO_2$ hydrates (or alternatively $N_2O$ or $CO_2/N_2O$ hydrates) are formed prior to introduction of nitrogen gas. For example, the $CO_2$ hydrates may be formed with carbon dioxide introduced at 10-50 bar, 15-25 bar, or about 20 bar and at 0 to 5° C. or about 2° C. (e.g. 1-2° C. and about 20 bar or more, or 20-30 bar). Once a small amount of $CO_2$ hydrates form (as shown by a drop in pressure and an exothermic peak on the temperature profile), nitrogen may be introduced to increase the total gas pressure. The amount of nitrogen introduced (i.e. the $CO_2:N_2$ ratio) and the required pressure will vary depending on the desired ratio of $CO_2/N_2$ in the gas hydrates. The total gas pressure may be increased to above 10-300 bar, 20-50 bar, 30-40 bar or about 35 bar, at −5° C. to 5° C., at 0 to 5° C. or about 2° C. The molar fraction of $CO_2$ (in the final gas mix) for forming the mixed $CO_2/N_2$ hydrates may be from 0.1 to 0.9, or from 0.2 to 0.8, or from 0.4 to 0.6, or from 0.47 to 0.54, or about 0.54. The fraction of $CO_2$ (in the final gas mix) should be such that $CO_2$ does not condense. For example, $CO_2$ will condense at about 8.5° C. and 43.4 bar for the 25 wt % sugar or lower temperatures and/or higher pressures.

As described above, the temperature and pressure required to form gas hydrates are interdependent and will vary depending on the gas and the composition of the aqueous solution used for the formation of the gas hydrate slurry comprising gas hydrates (e.g. the wt % of solids in the sugar solution) and the colligative properties of the solution comprising water (e.g. the freezing point depression).

To dissociate the gas hydrates present on the gas hydrate/food matrix mix, pressure must be decreased and/or temperature must be increased moving the system outside the stability region of given gas (or gas mixture) hydrate's phase diagram. Consequently, no gas hydrates may be present in the foamed sugar solution-based hydrate slurry/food matrix fluid (3SFMF fluid system) prior to stabilizing and freezing. The 3SFMF fluid system may contain gas or gas mixture residues of dissolved gas fractions from the liquid phase.

Sugar Solution-Based Slurry Comprising Gas Hydrates (3S Slurry)

A "sugar solution" according to the present invention is a solution comprising soluble sugar components. The 3S is a model solution for further gas hydrate slurries formed from other solutions or dispersions, which could be used instead of the sugar solution. More complex solutions may also comprise non-soluble components and/or such components in dispersion (suspension or emulsion).

An exemplary and representative sugar solution used for forming sugar solution-based slurry (3S) for use in the present invention may originate from different sugar sources. At the same time the sugar solution used for the formation of sugar solution-based gas hydrate slurries stands representative for any solution-based water containing continuous fluid system in which various soluble components can be contained and thus, depending on their concentration and possible interaction potential between each other as well as with the water and the gas molecules may impact on the temperature/pressure ranges in which gas hydrates can be formed. Furthermore and solution containing a sufficient water fraction of 30 to 40 vol % or more can be used in place of the sugar solution for formation of gas hydrate comprising slurries. As such, the continuous phase can also be non-aqueous, (e.g. an oil creating a water in oil emulsion).

The present invention provides a method for producing a representative sugar solution-based slurry (3S) comprising gas hydrates. The method comprises:
(a) providing a sugar solution;
(b) such representative sugar solution is cooled between −10° C. and 10° C., or to between −5° C. and 5° C., or no lower than about −7° C.;
(c) and/or the gas pressure is adjusted from 10 to 300 bar, or from 15 to 100 bar, or from 15 to 30 bar to provide a 3S sugar solution-based slurry comprising gas hydrates, wherein the gas comprises air and/or one or more of carbon dioxide, nitrogen, nitrous oxide, argon and oxygen, preferably carbon dioxide and/or nitrogen.

The method may further comprise a step of distributing the gas hydrate in the sugar slurry. The gas hydrate may be distributed during and/or after formation. Preferably the gas hydrate is distributed by mixing the 3S sugar slurry e.g. by using a dynamic or static mixer device for effective mixing. The gas hydrate may also be mixed in a scraped surface heat exchanger (SSHE) and/or a pin mixer and/or in a extrusion type of mixer and/or through a pump conveying action.

Preferably the sugar solution comprises 10 wt % to 65 wt %, 10 wt % to 50 wt %, 20 wt % to 40 wt %, 15 wt % to 35 wt % or about 25 wt % solids. Preferably the sugar solution has a viscosity of $10^{-2}$ and 10 Pas, or between 20 mPas and 1 Pas, or between 30 mPas and 500 mPas, or about 30 mPas or more, and/or about 100 mPas or less, or between 1 and 10 mPas, or about 5 mPas or more and/or about 100 mPas or less. The viscosity is typically interdependent on the wt % of solids, i.e. a higher wt % will result in a higher viscosity (see FIG. 6). For instance, a 50 wt % sugar solution may have a viscosity of around 25 to 44 mPas (at 0 to 10° C.) and 100 $s^{-1}$ shear rate, whilst a 25 wt % sugar solution may have a viscosity of around 3-5 mPas at 30 bar, 0 to 10° C. and 100 $s^{-1}$ shear rate. The viscosity may be determined by any method known to those of skilled in the art, for instance by a rheometer or a Coriolis flow meter. A 3S comprising gas hydrates from a 25 wt % sugar solution can have a viscosity around 35-40 mPas at 0° C. and a 3S comprising gas hydrates made from a 50 wt % sugar solution can have a viscosity around 62 to 390 mPas (at −1 to 3° C.).

Figure 1:
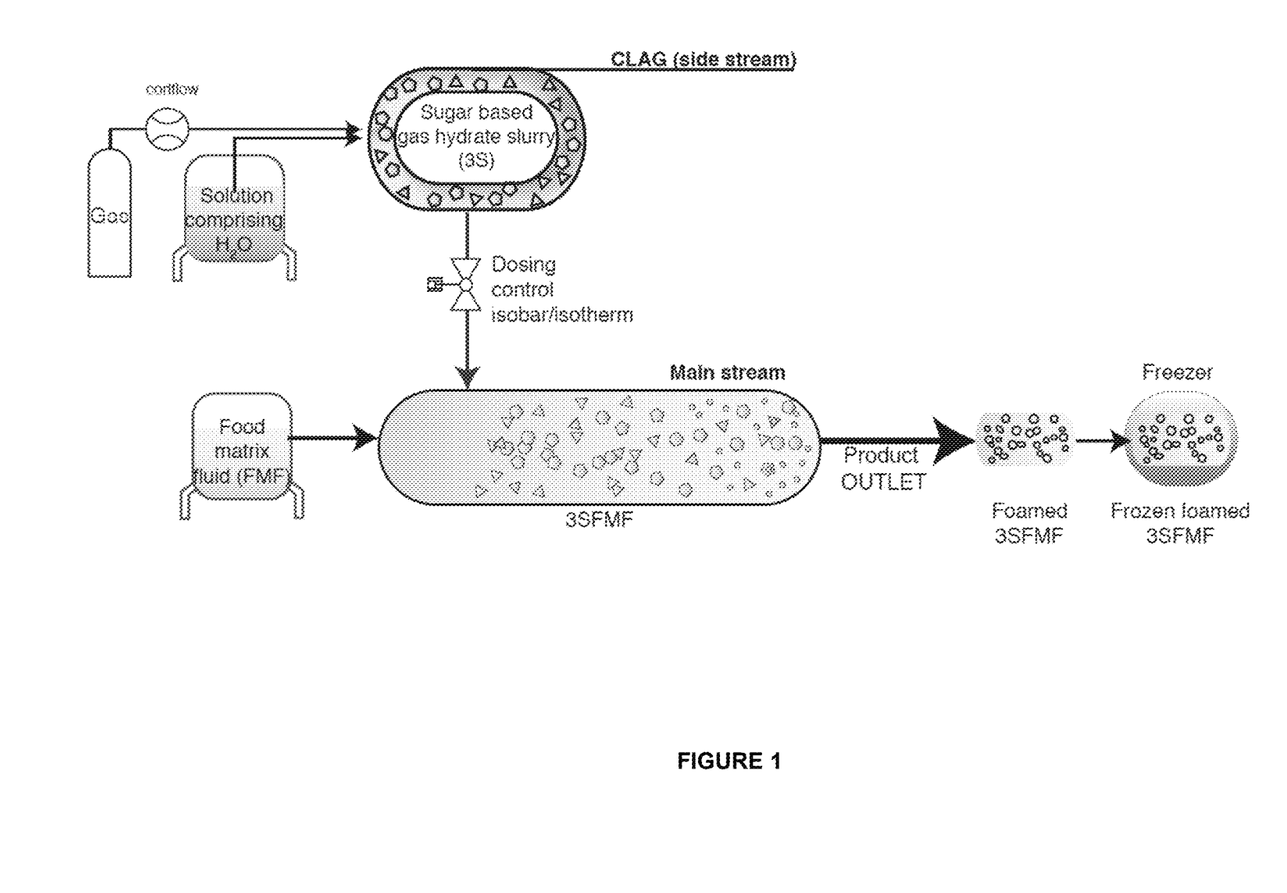
FIG. 1—Graphical presentation of the method of the invention
Figure 2:
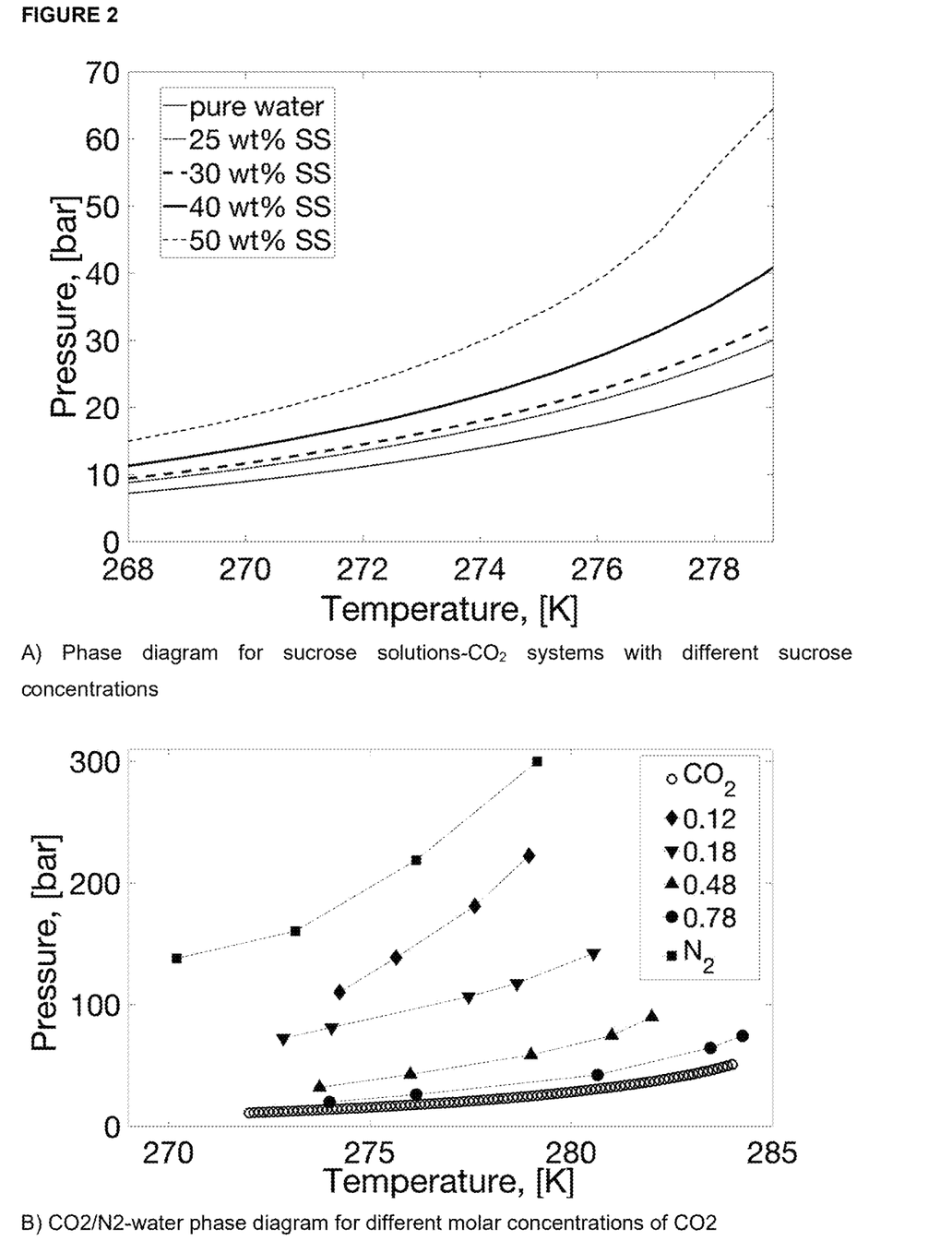
FIG. 2—Phase diagrams for 25 wt % sugar solution-$CO_2$ and 50 wt % sugar solution-$CO_2$ systems SS stands for sucrose solution. In (A) phase diagram for the $CO_2$ hydrate sugar (sucrose) solution system with different sucrose concentrations evaluated with a developed thermodynamic model. In (B) the $CO_2/N_2$ water system phase diagram.
Figure 6:
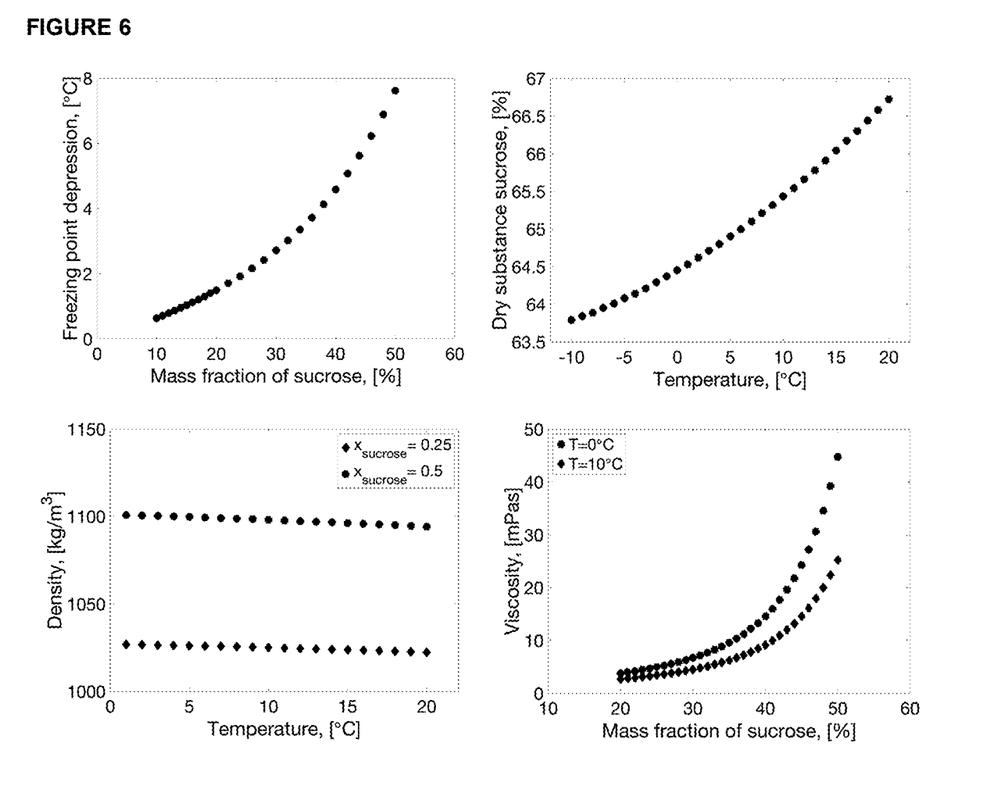
FIG. 6—Properties of sugar (sucrose) solutions, the freezing-point depression, maximum solubility of sucrose in water at a given temperature, density and viscosity are shown.

The temperature and pressure required to form gas hydrates are typically interdependent and will vary depending on the gas and the solution (e.g. the wt % of solids in the sugar solution, the freezing point depression and other colligative properties, see also FIG. 6). For example, FIG. 2 provides a phase diagram for formation of $CO_2$ hydrate in a 25, 30, 40 and 50 wt % sugar solution. There may be a need to avoid conditions in which ice forms and/or in which the gas condenses. For example, a 25 wt % sugar solution has a freezing point of about −2.04° C. and a 50 wt % sugar solution has a freezing point depression at −7.61° C.

For example, the sugar solution within which the gas hydrates shall be generated may be cooled to between −10° C. and 8° C., or to between −8° C. and 7° C., or to between −5° C. and 5° C., or to no lower than about −7.5° C., −5° C. or −2° C. or now lower than −1° C., depending on the gas, sugar concentration in solution and gas pressure. The gas pressure for gas hydrate formation may be from 10 to 300 bar, 10 to 100 bar, 10 to 50 bar, or from 15 to 40 bar, or from 15 to 35 bar, or from 15 to 30 bar, depending on the gas, sugar solution and temperature. Preferably, when a $CO_2$ hydrate is desired a 25 wt % sugar solution is cooled to 3-5° C. and pressurised with $CO_2$ to about 20-30 bar, or 20 bar or more. Preferably, when a $N_2$ hydrate is desired then a 25 wt % sugar solution is cooled to −2.5° C. to 5.5° C. and pressurised with $N_2$ to 135 to 285 bar. To form hydrates at lower pressures, lower temperatures must be used. Preferably, when a $CO_2/N_2$ mixed hydrate is desired the solution is cooled to about 2° C. and pressurised to about 20 bar with $CO_2$, prior to pressurising to about 35 bar with $N_2$ (and a molar fraction of $CO_2$ of about 0.54). Alternatively, when a $CO_2/N_2$ mixed hydrate with a high amount of $N_2$ is desired the solution is cooled to about 2° C. and pressurised to about 20 bar with $CO_2$, prior to pressurising to about 100 to 285 bar, or to about 100 to 200 bar with $N_2$ (and a molar fraction of $CO_2$ of about 0.1 or less).

The 3S sugar slurry comprising gas hydrates according to the present invention may be made of a sugar solution comprising 10 wt % to 65 wt %, 10 wt % to 50 wt %, 20 wt % to 40 wt %, 25 wt % to 35 wt %, 30 wt % to 35 wt %, or about 25 wt % solids.

The 3S sugar slurry comprising gas hydrates may have a viscosity or between $10^{-2}$ and 10 Pas or between 20 mPas to 1 Pas or between 30 mPas and 500 mPas or about 30 to 40 mPas and/or about 300 mPa or more.

The viscosity of the sugar solution may be increased by formation of the gas hydrates. Thus, the formation of the gas hydrates may be monitored by measuring the viscosity of the 3S sugar slurry. Preferably the viscosity of the 3S sugar slurry is greater than the solution provided without gas hydrates, for example up to 2, 4, 6, or 8 times greater. The viscosity may be determined by any method known to those of skill in the art, for example by a rheometer or a viscometer.

The 3S sugar slurry may comprise one or more of carbon dioxide, nitrogen, nitrous oxide and argon, oxygen preferably carbon dioxide and/or nitrogen. The sugar slurry may comprise 0.01-7.5 mol/L, 0.1-7.5 mol/L, 1-5 mol/L, 1-3 mol/L, or about 1-2 mol/L of gas. In some preferred embodiments the 3S slurry comprises carbon dioxide, preferably 0.5-5 mol/L, 1-5 mol/L, 1-2 mol/L, or about 1.4 mol/L. In some other preferred embodiments the 3S slurry comprises carbon dioxide, preferably 0.5-5 mol/L, 0.5-2 mol/L, or about 1 mol/L; and nitrogen, preferably 0.01-0.5 mol/L, 0.02-0.1 mol/L, or about 0.05 mol/L. The amount of gas refers to the total amount of gas in the 3S sugar slurry, i.e. in both the hydrate fraction and in the liquid fraction. The amount of gas may be measured by any method known to those skilled in the art, for example chromatography, FBRP, optical methods, piezo electrical sensors, impedance, or conductance measurements.

The 3S sugar slurry may have a ratio of gas in the hydrate fraction to gas in the liquid fraction (H:L) of from 5:1 with volumetric hydrate fractions of 10 to 35 vol %, or from 3:2 at volumetric hydrate fractions of 12 to 14 vol %, or 1.2:1 at 10 vol % hydrate, preferably 2:1 at 17 vol % gas hydrate fraction. The H:L ratio may be determined by any method known to those of skill in the art such as high-pressure chromatography, scattering or spectroscopy or thermodynamic modeling. Preferably, the majority of the gas is trapped in the gas hydrates.

Method of Producing a Frozen Foamed Sugar Solution-Based Food Matrix Fluid (Frozen Foamed 3SFMF) or Frozen Foamed Food Product The present invention provides a method for producing a frozen foamed food product, the method comprising:
(a) mixing a sugar solution-based slurry comprising gas hydrates (3S slurry) and another liquid to semi-liquid food Matrix Fluid (FMF, solution or dispersion) to provide a mixed 3SFMF fluid system;
(b) releasing the pressure and/or increasing the temperature of the 3SMF fluid system to provide a foamed 3SFMF;
(c) Fixing the foamed 3SFMF by freezing, preferably at −25 to −5° C. providing a frozen foamed food product Advantageously, adding gas in its solid form (e.g. as a gas hydrate of a gas hydrate slurry such as 3S slurry) facilitates the mixing of the gas in the sugar solution and/or decreases the length of time required to gasify the solution and/or reduces the energy required to gasify the solution. The 3S slurry may be produced in a side stream. Such initial sugar solution does not comprise gas hydrates. The initial sugar solution may comprise 10 wt % to 65 wt %, 10 wt % to 50 wt %, 20 wt % to 40 wt %, 15 wt % to 35 wt % or about 25 wt % solids. Preferably such initial sugar solution, may comprise about 25 wt % sugar solids with a viscosity of around 3-5 mPas at 30 bar, 0 to 10° C. and 100 $s^{-1}$ shear rate. Upon gas hydrate generation thus forming the 3S sugar solution-based slurry the viscosity increases since the gas hydrates form a crystalline disperse phase. The 3S fluid is preferably adjusted close to the viscosity of the food matrix fluid (FMF) system into which it is mixed for foam generation, because the mixing efficiency is facilitated by equal viscosities of the two fluid to be mixed. Respective viscosity levels range between 30 mPas and 10 Pas, or about 30 mPas or more, and/or about 300 mPas or more, or between 1 and 10 mPas, or about 5 mPas or more and/or about 300 mPas or more or about 500 mPas. The viscosity of the food matrix fluid (FMF) will depend on its base fluid viscosity and the concentration of dissolved and/or dispersed components, it will also depend on temperature and mechanical forces applied. The viscosity of the 3S slurry will be interdependent on the wt % of sugar solids, i.e. a higher wt % will result in a higher viscosity and lower the gas hydrate fraction generated.

In a special case of the inventive embodiment the 3S slurry and the food matrix fluid (FMF) will be of similar nature (e.g. sugar solution based). In such case the FMF may contain e.g. 60 wt % of dissolved sugar whereas the 3S slurry is based on a 25 wt % containing sugar solution which upon a 10-20 vol % gas hydrate crystal fraction formation can reach a comparable viscosity with the gas hydrate free FMF fluid, which then facilitates the mixing of 3S and MF thus efficiently reaching a homogeneous 3SFMF fluid system, ready for foaming under temperature increase and/or static pressure release.

The viscosity may be determined by any method known to those of skill in the art, for instance by a rheometer. Preferably the viscosity is determined at a shear rate of 500 $s^{-1}$ and a temperature of 1° C. for the 3S slurry and 3SFMF fluid system comprising gas hydrates and at a shear rate of 100 $s^{-1}$ and a temperature of 7 to 10° C. for the initial sugar solution and the FMF not comprising gas hydrates.

The 3S slurry (side stream) and the FMF fluid (main stream) may be mixed by adding the 3S slurry to the FMF fluid, i.e. by dosing the 3S side stream into the FMF main stream. The mixing of the 3S side stream into the MF main stream produces the 3SFMF fluid system. Preferably, the 3SFMF fluid system remains in the main stream at the end of mixing. In some embodiments the 3S slurry side stream rate is 5-200 ml/min, or 10-100 ml/min, or about 15 to 60 ml/min or about 30 ml/min and the FMF main stream rate is 100-500 ml/min or 100-200 ml/min, or about 170 ml/min. For example, when the 3S slurry comprises a $CO_2$ hydrate the 3S side stream may be added at a rate of 10-30 ml/min into a 150-300 ml/min MF main stream. In some embodiments the ratio of the side stream rate:main stream rate is less than 1, or 0.01 to 0.5, or 0.05 to 0.1, or about 0.08.

In some embodiments the 3S slurry is added to the FMF by dosing (i.e. by adding a specific amount (volume) of the 3S slurry at discrete time intervals). In some embodiments the amount (volume) of 3S slurry added is 1 to 1000 $cm^3$, 1 to 100 $cm^3$, 1 to 50 $cm^3$, 10 to 50 $cm^3$, or 5 to 20 $cm^3$, or about 15 $cm^3$. In some embodiments such 3S dose is added every 1 to 1000 seconds, or every 5 to 200 seconds, or every 60 to 100 seconds. In some embodiments 10 to 50 $cm^3$ is added every 60 to 100 seconds.

In some embodiments the amount (volume) of 3S added and/or the rate is sufficient to provide 0.001 to 1 mol/min, or 0.02 to 0.1 mol/min of gas to the FMF. For example, when the 3S comprises a $CO_2$ hydrate the volume of slurry added to the FMF and the rate may be such that 0.02 to 0.1 mol/min of $CO_2$ is provided; and when the 3S comprises a $CO_2/N_2$ hydrate the volume of slurry added and the rate may be such that 0.02 to 0.1 mol/min of $CO_2$ and 0.001 to 0.005 mol/min of $N_2$ is provided.

In some embodiments the 3S (side stream) and the FMF (main stream) are mixed and/or the side stream is added to the main stream under close to (i.e. approximately or about) isobaric-isothermal conditions, preferably isobaric-isothermal conditions. "Isobaric-isothermal conditions" according to the present invention are those in which mixing is at a constant temperature and constant static pressure. Preferably the isobaric-isothermal conditions are the same as the conditions of the 3S (side stream) prior to mixing, i.e. the isobaric-isothermal conditions refer to the pressure and temperature at the inlet where the 3S side stream enters the FMF main stream. Approximately isobaric-isothermal conditions may be within ±2° C. and ±5 bar of isobaric-isothermal conditions. Preferably the temperature and gas pressure are suitable for the formation and/or retention of the gas hydrates, as described above. Accordingly, the temperature may be between −10° C. and 10° C., or to between −5° C. and 5° C., or no lower than about −7° C., depending on the gas, sugar solution composition and temperature. The temperature and pressure required to form and/or retain gas hydrates are interdependent and will vary depending on the gas and the solution composition (e.g. the wt % of solids in the sugar solution) and the colligative properties of the sugar solution. In preferred embodiments the 3S and the FMF streams are mixed at about 20-35 bar, or about 20 bar or more pressure and/or 4 to 7° C. (wherein the 3S comprises a $CO_2$ hydrate). In other embodiments the 3S and the FMF are mixed at about 135 to 285 bar pressure and/or about −2.5° C. to 5.5° C. (wherein the 3S comprises a $N_2$ hydrate). In preferred embodiments the 3S and the FMF are mixed at about 35 bar $CO_2/N_2$ total gas pressure and/or 1-5° C., or about 3° C. (wherein the 3S comprises a $CO_2/N_2$ mixed hydrate). In some embodiments the 3S (side stream) and the FMF (main stream) are mixed under the same temperature and/or pressure used to produce the 3S comprising gas hydrates.

According to the present invention, the 3SFMF is preferably a foamed solution or dispersion (emulsion or suspension) after mixing of the 3S slurry and the FMF fluid and expanding it. Preferably the mixing continues until the foamed 3SFMF (i.e. foamed sugar containing solution/dispersion) reaches an overrun of from 50 to 500%, or from 100 to 500%, or from 100 to 150%, or from 50% to 100%, preferably 100%. In some embodiments after reaching the desired overrun (e.g. 50 to 500%, or from 100 to 500%, or from 100 to 150%, or from 50% to 100%, preferably 100%), the 3S side stream (sugar solution-based slurry) is added continuously at a constant dosing rate to the main stream FMF to maintain the desired overrun, for example at a dosage rate sufficient to provide 0.001 to 1 mol/min, or 0.02 to 0.1 mol/min of gas to the FMF in the main stream. In some embodiments the mixing continues until the 3SFMF fluid system comprises 0.01-7.5 mol/L, 0.1-7.5 mol/L, 1-5 mol/L, 1-3 mol/L, or about 1-2 mol/L of gas. In some preferred embodiments the 3S slurry comprises carbon dioxide, preferably 0.5-5 mol/L, 1-5 mol/L, 1-2 mol/L, or about 1.4 mol/L. In some other preferred embodiments the 3S slurry comprises carbon dioxide, preferably 0.5-5 mol/L, 0.5-2 mol/L, or about 1 mol/L; and nitrogen, preferably 0.01-0.5 mol/L, 0.02-0.1 mol/L, or about 0.05 mol/L.

In some embodiments the method comprises an additional step of releasing the pressure and/or increasing the temperature of the 3SFMF fluid system to provide a foamed liquid product stream. Preferably this step decomposes the gas hydrates and releases the gas into the 3SFMF fluid system. The temperature and pressure required to decompose gas hydrates are interdependent and will vary depending on the gas and the solution composition (e.g. the wt % of solids in the FMF) and the solution colligative properties. The gas pressure and temperature will thus depend on the identity of the gas hydrates. The gas pressure may be released. In some embodiments, the gas pressure may be lowered preferably stepwise to between 1 bar and 100 bar, or to between 5 bar to 50 bar before finally releasing it to an atmospheric/ambient surrounding, and/or the temperature of the 3SFMF fluid system is increased to between −5° C. and 15° C., or to above 0° C., or about 10° C. Preferably the gas pressure is released (i.e. the temperature is not increased). For example, for $CO_2$ (or mixed $CO_2$) hydrates in a 25 wt % sugar solution the gas pressure may be lowered below about 20 bar (e.g. 1-15 bar, 1-10 bar, or 1-5 bar) at a temperature of 1-2° C. For example, for $N_2$ hydrates in a 25 wt % sugar solution the gas pressure may be lowered below about 135 bar (e.g. 1-100 bar, 1-50 bar, 1-20 bar) at a temperature of −2.5° C. to 5.5° C.

In some embodiments, the method comprises of a fixing/stabilization step, where the foamed 3SFMF is stabilized at freezer conditions at ambient pressure and −25 to −5° C., or between −25 to −18° C. The step of freezing or stabilizing the foamed 3SFMF can be done by any method.

"Overrun" of a foamed 3SFMF as used herein is the increase in volume of the foamed 3SFMF compared to the unfoamed 3SFMF fluid system. The overrun can be determined by any method known to those of skill in the art.

As referred to herein, "ice cream" is typically a sweetened frozen food typically eaten as a snack or dessert. It may be made from dairy milk or cream, or soy, cashew, coconut or almond milk, and is flavored with a sweetener, either sugar or an alternative, and any spice, such as cocoa or vanilla. Colorings are usually added, in addition to stabilizers.

As referred to herein, sorbet is typically a frozen dessert made from sweetened water with flavoring (typically fruit juice or fruit purée, wine, liqueur, or very rarely, honey).

As referred to herein, mousse, particularly a sweet mousse is typically made with whipped egg whites, whipped cream, or both, and flavored with one or more of chocolate, coffee, caramel, puréed fruits, or various herbs and spices, such as mint or vanilla. In the case of some chocolate mousses, egg yolks are often stirred into melted chocolate to give the final product a richer mouthfeel. Mousses are also typically chilled before being served, which gives them a denser texture. Sweetened mousse is served as a dessert, or used as an airy cake filling.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

As used herein the term "about" means approximately, in the region of, roughly, or around. When the term "about" is used in conjunction with a numerical value or range, it modifies that value or range by extending the boundaries above and below the numerical value(s) set forth. In general, the term "about" is used herein to modify a numerical value(s) above and below the stated value(s) by 10%.

EXAMPLES

Example 1—Characterisation of Gas Hydrate Formation in Exemplary Sugar Solutions Gas Solubility in Sugar Solutions For a description solubility of gaseous $CO_2$ in water or sugar solution, a modeling approach was used. The model was based on Krichevsky-Kasarnovsky gas equation for real systems using a functional-group activity coefficient UNIFAC method based on Gros et al., 1999, Biotechnol. Prog., Estimation of $O_2$ and $CO_2$ Solubility in Microbial Culture Media and Catté et al., 1995, Fluid Phase Equilibria, A physical chemical UNIFAC model for aqueous solutions of sugars to estimate Henrys constants. Experimental studies in a high-pressure stirred reactor were later conducted to verify the model for 25 wt % sugar solutions at 10, 20 and 30 bar at 5 and 10° C. Assuming the reactor as a closed system, the gas consumption from the headspace of the vessel into the fluid was assessed with cubic equations of state used for the calculation of the compressibility factors at the time point after pressurization and in equilibrium. The results of the experiment are shown in table 1. The experimental data were slightly underestimated by the model (10%). Using sucrose in the model, and industrial sugar in the application could cause this.

TABLE 1

Comparison of $CO_2$ solubility expressed as molar fractions of $CO_2$ ($xCO_2$) in the 25 wt % sugar solution

| System | Temp. tested | $xCO_2$ at 30 bar | $xCO_2$ at 20 bar | $xCO_2$ at 10 bar |
| --- | --- | --- | --- | --- |
| Sugar solution 25 wt % | 5° C. | 0.015 | 0.012 | 0.008 |
| Sugar solution 25 wt % | 10° C. | 0.012 | 0.001 | 0.0065 |

Gas-Sugar Solution Phase Diagrams

Figure 3:
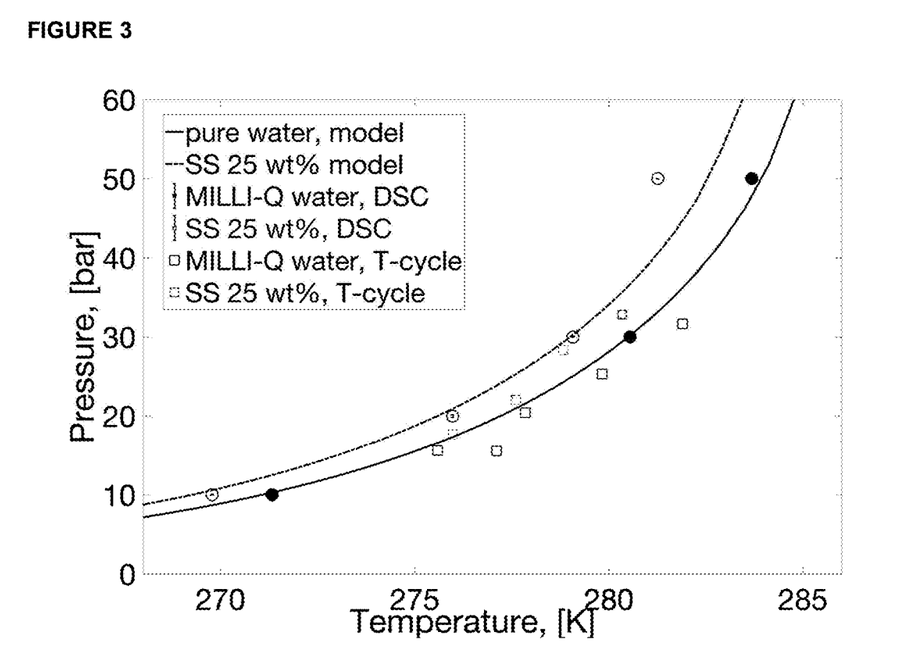

The phase diagrams for the sugar solution-$CO_2$ systems defining the Hydrate-Liquid-Vapor gas hydrate boundary zones were derived from a rigorous thermodynamic model based on the papers of Klauda and Sandler, 2000, Industrial and Engineering Chemistry Research, A fugacity model for gas hydrate phase equilibria and Bhawangirkar et al., 2017, Journal of Chemical Thermodynamics, Thermodynamic modeling of phase equilibria of clathrate hydrates formed from CH4, CO2, C2H6, N2 and C3H8, with different equations of state. The model accounted for ternary systems excluding the ice and condensed $CO_2$ phase. FIG. 2 (A) shows the resulting boundaries for 25, 30, 40 and 50 wt % sugar solution-$CO_2$ systems increasing the Hydrate-Liquid-Vapor gas hydrate stability zone as the sugar concentration increased. The model was validated with a T-cycle (15% deviation from the model) method and HP-DSC (5.6% deviation from the model) described in the methods section, see also FIG. 3. The methods resulted in dissociation pressure-temperature conditions for given systems, describing points on the equilibrium line.

Additionally a phase diagram describing the phase boundaries of CO2:N2 mixed gas hydrates for the CO2, N2-water system is shown.

Rheology of Sugar Solutions and Gas Hydrate Comprising Sugar Solutions

The viscosity of sugar solutions and sugar-solution based $CO_2$ hydrate slurries were assessed in the rheometer for 25 and 50 wt % sugar solutions. Additionally 55 and 60 wt % sugar solutions not comprising gas hydrates were assessed. The sugar solutions were described as Newtonian fluids with higher viscosities at higher sugar concentrations. Sugar solution-based gas hydrate slurries exhibited Non-newtonian shear thinning behavior with a yield stress. The accurate determination of the yield stress was not possible. Apparent viscosities of gas hydrate slurries reached 10 Pas at temperatures <0° C. In general high shear rates (500 $s^{-1}$) were needed to describe gas hydrate slurries with a vane geometry. Viscosity values acquired for the 25 wt % sugar solution were 5 mPas at 5° C. and 25 wt % sugar solution-based gas hydrate slurry 35 to 40 mPas at 0° C. For the 50 wt % sugar solution viscosity values around 30 mPas at 0° C. and 500 s−1 and the 50 wt % sugar solution-based gas hydrate slurry around 60 to 390 at temperatures from −1 to 3° C. The 55 wt % and 60 wt % sugar solutions had viscosities of around 74 to 90 mPas and 170 to 250 mPas respectively at 0 to 5° C.

Figure 4:
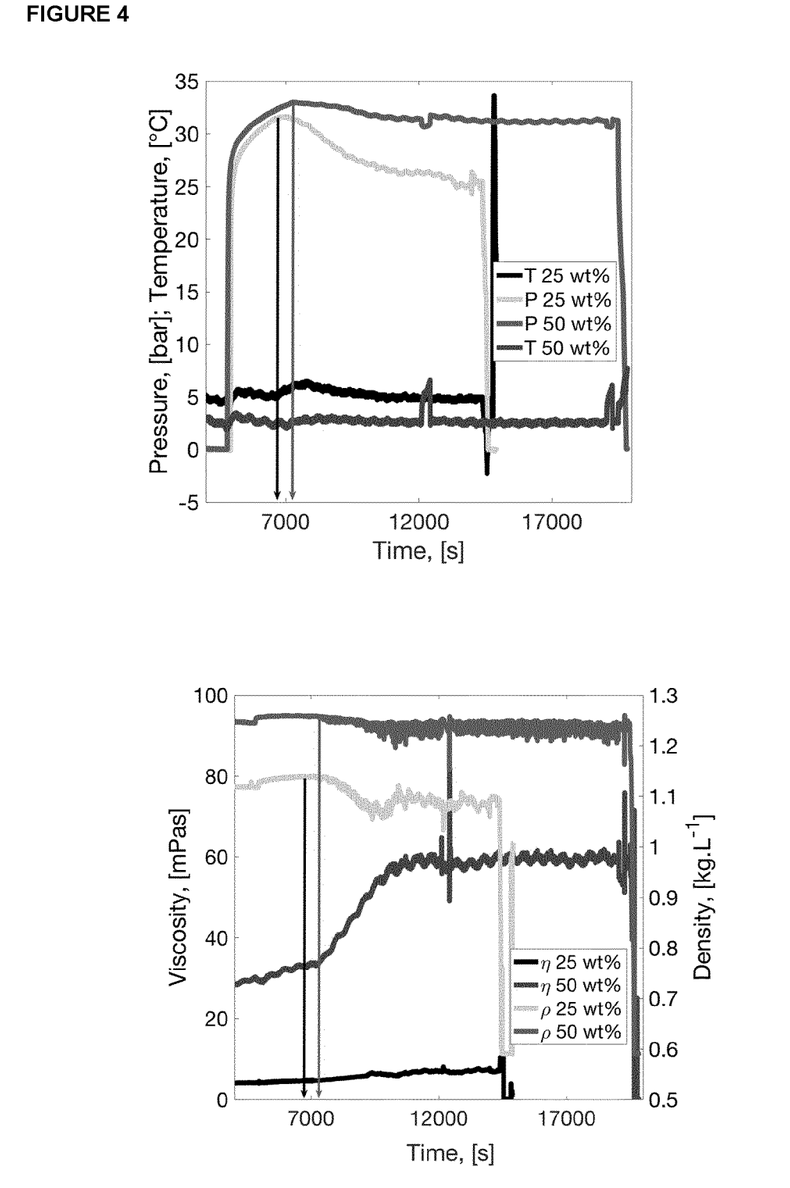
FIG. 4—Example of formation conditions of the 25 wt % and 50 wt % sugar solution-based gas hydrate slurries (3S slurry) in the high-pressure CLAG reactor Pressure (P), Temperature (T), viscosity (q) and density (p) formation and growth of sugar solution-based gas hydrate slurries (3S) over time.

Example 2—Production of Sugar Solution-Based Slurries (3S) Comprising Gas Hydrates For producing 3S slurries in the CLAG reactor (also described as the side stream), Scraper velocities >0.9 m·$s^{-1}$ with shaft speeds of 800 rpm on the embedded surface-scraped heat exchanger were evaluated as the best conditions for formation of high gas hydrate fraction slurries with homogeneous flow patterns and fast formation kinetics (range of minutes). Examples of processing variables (temperature, pressure, density and viscosity) for the formation experiments are shown on FIG. 4. Temperatures of 4 to 7 were mainly used for the 25 wt % sugar solution and 2-3 for the 50 wt % sugar solution at pressures between 30 and 35 bars. Gas hydrate fractions of 10 to 34.1 vol % were achieved. Maximum sugar contents of 64 wt % in the continuous phase were achieved at processing temperatures of around 5° C.

Example 3—Production of Foamed Sugar Solution-Based Slurries/Food Matrix Fluid Mixtures (3SFMF Fluid System)

Figure 5:
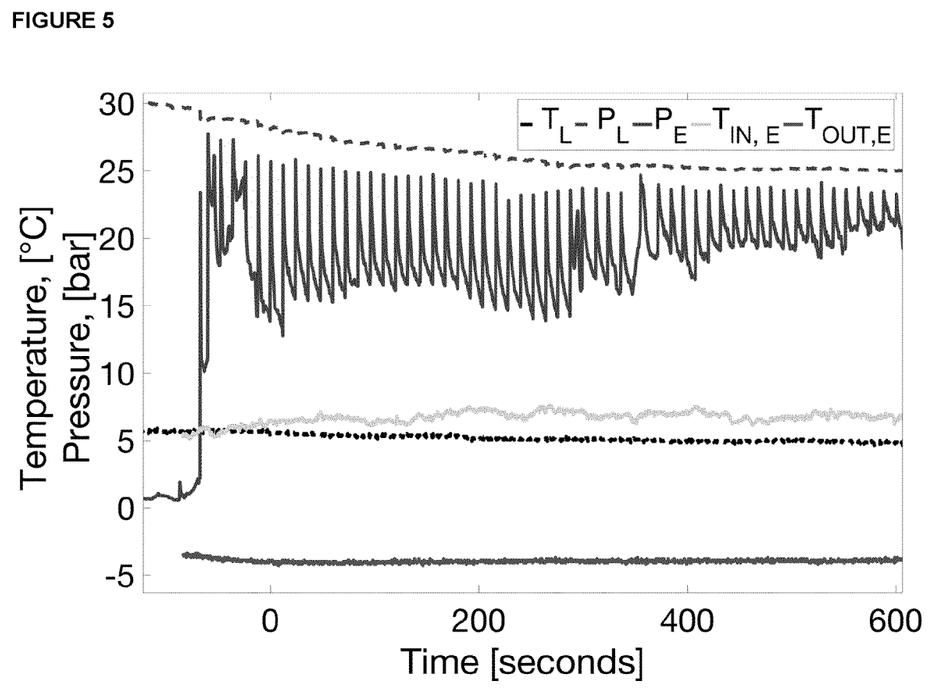
FIG. 5—Example of processing conditions on the CLAG reactor (side stream) and the EGLI reactor (main stream) during the transfer of 3S slurry from the side stream into the main stream (FMF)

The formed gas hydrate slurries in the side stream CLAG loop generator were then transferred into the main stream line consisting of an adapted mini pilot plant main stream device originally designed for margarine processing. Here a model ice cream mix was frozen and mixed with the sugar solution-base gas hydrate slurry using surface scraped heat exchangers. This mix was then foamed by expanding. Final products with average outlet temperatures of −5° C. resembled soft ice cream. According to the thermodynamic model, sugar solution $CO_2$ slurries with hydrate volumetric fractions of 0.13-0.17 could store on average 66% more gas than in saturated sugar solutions containing no gas hydrate. FIG. 5 shows examples of conditions on the side stream (L) and main stream (E) showing a close to isotherm and isobaric transfer.

After expansion of the sugar solution based gas hydrate slurries/ice cream mixes, at outlet temperatures of −5° C., the samples were analyzed for their overrun and immediately stabilized and stored at −25° C. The overrun values ranged from 65 to 350% with a maximum of 500%.

Example 4—Methods

Differential Scanning Calorimetry (DSC)

High-pressure differential scanning calorimetry was used to validate the thermodynamic model used for gas hydrate equilibria. Samples of around 100 μg were loaded into measuring crucibles and sealed. Gas at pressures of 10, 20, 30 or 50 bar was supplied throughout the measurement. The temperature profile in table 2 was applied and cycled through 3 times. In each repetition in the $4^{th}$ segment, an endothermic peak indicated the dissociation of a gas hydrate phase. The dissociation point was taken as the onset temperature of the endothermic decomposition peak. These points were then compared with the model, see also FIG. 3.

TABLE 2

DSC temperature profile for studying gas hydrate transitions

| Segment | Temperature | Rate |
|---|---|---|
| 1 | 20° C. | Constant 1 h |
| 2 | 20 to −30° C. | 0.5° C. · min$^{-1}$ |
| 3 | −30° C. | Constant 1 h |
| 4 | −30 to 20° C. | 0.2° C. · min$^{-1}$ |
| 5 | 20° C. | Constant 1 h |

T Cycle (Temperature-Cycle)

The isochoric heating and cooling temperature cycle method was performed in a high-pressure stirred reactor and used to validate the thermodynamic model used for gas hydrate equilibria and evaluation of gas hydrate slurries molar composition. The stirred reactor was filled with 100 ml of the 25 wt % or 50 wt % sugar solution and set under partial vacuum (34 mbar). Afterwards the vessel was pressurized with $CO_2$ to 25, 30, 35, 40 or 45 bars of pressure. When the system equilibrated, the mixer was turned on to 500 rpm and a cooling ramp was applied at 2.5° C.·h$^{-1}$. Hydrate formation was then followed by a pressure drop (indicating gas consumption) and a exothermic signal on the temperature curve. After reaching equilibrium, a slower heating ramp of 0.5° C.·h$^{-1}$ was applied until the hydrate dissociated (indicated as a kink on the heating curve). This temperature and pressure condition was taken as the equilibrium point of the Hydrate-Liquid-Vapor line for the gas hydrate system and compared with the thermodynamic model, see also FIG. 3.

Cryo Scanning Electron Microscopy (Cryo-SEM)

Cryo-SEM images were conducted on the withdrawn frozen ice cream products after >two weeks of storage at −25° C. The samples were punched with an aluminum tube with an inner diameter of 1.16 mm, wall thickness 0.13 mm and 20 mm length. The tubes were then stabilized in liquid nitrogen and transported to the ScopeM center at ETH Zurich, where the analysis was conducted. The samples were cut open under liquid nitrogen to obtain a fresh surface and transferred to the BAF060 cryo-SEM preparation station, where the sample was shortly etched and thereafter coated with a carbon metal mix to a layer thickness of 6 nm un-der vacuum with an e-beam gun at 1.95 kV. The sample tubes were finally transferred in a Gatan cryo-vacuum-holder to the SEM (Hitachi S-900), where the samples were visualized with various magnifications.

The invention claimed is:

1. A method of producing a sugar solution-based gas hydrate slurry, the method comprising:
   (a) providing a sugar solution comprising water;
   (b) cooling the sugar solution comprising water to between 0° C. and 5° C.;
   (c) pressurizing the sugar solution comprising water with carbon dioxide ($CO_2$) to 15 to 25 bar followed by introducing nitrogen ($N_2$) to increase the total gas pressure to a pressure from 30 to 285 bar, to provide a slurry comprising gas hydrates.

2. The method according to claim 1, wherein the method further comprises a step of distributing the gas hydrate in the sugar solution-based gas hydrate slurry.

3. The method according to claim 1, wherein the sugar solution-based gas hydrate slurry comprises 0.01 to 7.5 mol/L of the $CO_2$ and 0.01 to 0.5 mol/L of the $N_2$.

4. The method according to claim 1, wherein the sugar solution-based gas hydrate slurry has a ratio of gas hydrate to liquid hydrate of about 5:1 with 10 to 35 vol % gas.

5. The method according to claim 1, wherein the sugar solution-based gas hydrate slurry comprises 10 wt % to 65 wt % solids.

6. The method according to claim 1, wherein the sugar solution-based gas hydrate slurry has a viscosity of between $10^{-2}$ and 10 Pas.

7. The method according to claim 1, wherein the sugar solution-based gas hydrate slurry has a viscosity between 20 mPas and 1 Pas.

8. The method according to claim 1, wherein the sugar solution-based gas hydrate slurry has a viscosity between 30 mPas and 500 Pas.

9. The method according to claim 1, wherein the sugar solution-based gas hydrate slurry comprises 0.5-5 mol/L of the $CO_2$ and 0.02-0.1 mol/L of the nitrogen.

* * * * *